(12) United States Patent
Nichol et al.

(10) Patent No.: US 10,080,937 B1
(45) Date of Patent: Sep. 25, 2018

(54) SELF-CENTERING COUNTERBALANCED WALKING CART

(71) Applicants: John Philip Brett Nichol, Sebastian, FL (US); Jacqueline Ann Nichol, Sebastian, FL (US)

(72) Inventors: John Philip Brett Nichol, Sebastian, FL (US); Jacqueline Ann Nichol, Sebastian, FL (US)

( * ) Notice: Subject to any disclaimer, the term of this patent is extended or adjusted under 35 U.S.C. 154(b) by 0 days.

(21) Appl. No.: 15/806,542

(22) Filed: Nov. 8, 2017

(51) Int. Cl.
| A63B 55/00 | (2015.01) |
| A63B 55/10 | (2006.01) |
| A63B 55/40 | (2015.01) |
| A45B 11/00 | (2006.01) |
| B62B 1/26 | (2006.01) |
| B62B 5/00 | (2006.01) |
| B62B 3/10 | (2006.01) |

(52) U.S. Cl.
CPC ............ *A63B 55/10* (2013.01); *A45B 11/00* (2013.01); *A63B 55/40* (2015.10); *B62B 1/262* (2013.01); *B62B 3/102* (2013.01); *B62B 5/0013* (2013.01); *A63B 2225/09* (2013.01); *B62B 2202/406* (2013.01); *B62B 2203/44* (2013.01)

(58) Field of Classification Search
CPC ........ A63V 55/10; A63V 55/57; A63V 55/60; A63V 55/00; A63V 55/40; A63V 55/30; A63B 55/10; A63B 55/57; A63B 55/60; A63B 55/00; A63B 55/40; A63B 55/30
See application file for complete search history.

(56) References Cited

U.S. PATENT DOCUMENTS

| 2,520,226 | A | * | 8/1950 | Smith | .................... B62B 1/04 |
| | | | | | 280/652 |
| 2,597,386 | A | * | 5/1952 | Schmid | .................. A63B 55/60 |
| | | | | | 280/40 |
| 2,726,874 | A | * | 12/1955 | Sullivan | ................. A63B 55/57 |
| | | | | | 280/37 |
| 2,911,228 | A | * | 11/1959 | Green | .................... A63B 55/60 |
| | | | | | 280/655 |
| 3,738,677 | A | * | 6/1973 | Renock | .................. A63B 55/60 |
| | | | | | 280/37 |
| 5,168,992 | A | * | 12/1992 | Bowdy | .................. A63B 55/00 |
| | | | | | 206/315.4 |
| 5,269,411 | A | * | 12/1993 | Hong | ..................... A63B 55/10 |
| | | | | | 206/315.2 |

(Continued)

*Primary Examiner* — Hau V Phan
(74) *Attorney, Agent, or Firm* — Glenn E. Gold; Glenn E. Gold, P.A.

(57) ABSTRACT

A self-centering counterbalanced walking cart includes a mobile carriage and a holder body supported upright and centered thereon. The holder body has an endless sidewall defining an interior storage cavity, golf club clips and recessed decks on the endless sidewall, and handle and stand pivotally coupled at a lower portion and extending upright along opposite sides of the endless sidewall. The clips are spaced from one another and affixed about the exterior of an upper annular portion of the endless sidewall for retaining golf clubs about and in upright orientations along the exterior of the holder body. The recessed decks are defined in and spaced apart from one another about the exterior of the lower annular portion of the endless sidewall for receiving heads of the golf clubs retained upright by the golf club clips. The mobile carriage may be a two-wheel or four-wheel version.

17 Claims, 9 Drawing Sheets

(56) References Cited

U.S. PATENT DOCUMENTS

| | | | | |
|---|---|---|---|---|
| 5,350,982 | A * | 9/1994 | Seib | B60L 11/1805 |
| | | | | 280/DIG. 5 |
| 6,145,660 | A * | 11/2000 | Chou | A63B 55/00 |
| | | | | 206/315.3 |
| 6,550,793 | B2 * | 4/2003 | Carter | A47F 3/004 |
| | | | | 280/37 |
| 6,622,859 | B2 * | 9/2003 | Morgenstern | A63B 55/00 |
| | | | | 206/315.3 |
| 6,979,019 | B2 * | 12/2005 | Chen | A63B 55/00 |
| | | | | 280/652 |
| 8,991,598 | B2 * | 3/2015 | Whitworth | A63B 55/40 |
| | | | | 206/315.6 |
| 9,162,695 | B2 * | 10/2015 | Tran | B62B 3/02 |
| 2004/0206556 | A1 * | 10/2004 | Fricker | B60L 11/1822 |
| | | | | 180/19.3 |
| 2012/0061157 | A1 * | 3/2012 | Whelan | A63B 55/00 |
| | | | | 180/54.1 |
| 2017/0296890 | A1 * | 10/2017 | Maguire | A63B 55/30 |

* cited by examiner

SELF-CENTERING COUNTERBALANCED WALKING CART

FIELD OF THE INVENTION

The present invention relates to walking carts for golf and the like, and more particularly, a self-centering counterbalanced walking cart.

BACKGROUND OF THE INVENTION

For many years the design of a conventional two-wheeled walking cart for golf provides that it travel at a forward tilted position when pulled and stand at a vertical position when parked. When standing in the parked position the load of the golf cart is balanced between the wheels over their rotational axis. In the forward tilted position the load is shifted forward and thus unbalanced from over the rotational axis of the wheels toward the user pulling the golf cart. This load-shifted unbalanced condition makes it harder for the user to pull the golf cart while having to hold the golf cart in its forward tilted position as well.

To overcome the problem of imposing the load-shifted unbalanced condition of the golf cart on a user, designers merely added one or two more wheels to the golf cart in order to relieve the user of having to support the unbalanced load while pulling the golf cart. However, the decision to add more wheel(s) to the golf cart meant more frame structure and steering, folding and braking mechanisms needed to be added to the golf cart as well. This resulted in more weight, moving parts, wear and maintenance, and also the need for more locker storage and car trunk space.

Accordingly, there remains a need in the art for an innovation that will overcome any deficiencies of these past approaches and any problems that may still be unsolved.

SUMMARY OF THE INVENTION

The present invention is directed to an innovation providing a self-centering counterbalanced walking cart that overcomes deficiencies of the known art and problems that remain unsolved.

In one aspect of the present invention, a walking cart includes:
a holder body including
  an endless sidewall having opposite bottom and top ends,
  a multiplicity of golf club clips spaced from one another about an exterior surface of the endless sidewall and affixed on an upper annular portion of the endless sidewall spaced below and adjacent to the top end thereof for receiving and releasably retaining golf clubs in upright orientations along the exterior surface of the endless sidewall, and
  multiplicities of spaced apart external apertures and spaced apart corresponding internal decks formed through the exterior surface of the endless sidewall at a lower annular portion of the endless sidewall spaced above and adjacent to the bottom end thereof such that the external apertures and corresponding internal decks are spaced below and aligned with the golf club clips for receiving and seating heads of the golf clubs through the external apertures and onto the corresponding internal decks; and
a mobile carriage supporting the holder body in a self-centering counterbalanced relationship on the mobile carriage.

In another aspect of the present invention, the endless sidewall of the holder body is of a cylindrical configuration. Also, the multiplicity of golf club clips are disposed in a horizontal row at the same elevation about the exterior surface below the top end of the endless sidewall of the holder body. The multiplicities of external apertures and corresponding internal decks are arranged in lower and upper horizontal rows at different elevations about the exterior surface and above the bottom end of the endless sidewall of the holder body. The external apertures and corresponding internal decks in one of the rows are offset from the external apertures and corresponding internal decks in the other of the rows.

In another aspect of the present invention, the walking cart also includes a handle disposed at a forward side of the endless sidewall of the holder body. The handle has an elongated shaft pivotally coupled at a bottom end to the bottom end of the endless sidewall, and a coupling rod pivotally coupled at an outer end to the elongated shaft and telescopically and slidably adjustable at an inner end relative to the front side of the endless sidewall so as to limit extension of the coupling rod from the endless sidewall while still enabling adjustment of an angular position of the elongated shaft of the handle relative to the holder body to accommodate users of different heights. The handle also has a hand grip at an upper end of the elongated shaft such that proximate the hand grip the elongated shaft has upper and lower telescoping sections that enable adjustment of the length of the handle to accommodate users of different heights.

In another aspect of the present invention, a walking cart includes:
a holder body including
  an endless sidewall having a closed bottom end and an open top end defining an interior storage cavity therebetween being open at a top and closed at a bottom thereof,
  a multiplicity of golf club clips spaced from one another about an exterior surface of the endless sidewall and affixed on an upper annular portion of the endless sidewall spaced below and adjacent to the open top end thereof for receiving and releasably retaining golf clubs in upright orientations along the exterior surface of the endless sidewall, and
  multiplicities of spaced apart external apertures and spaced apart corresponding internal decks formed through the exterior surface of the endless sidewall at a lower annular portion of the endless sidewall spaced above and adjacent to the closed bottom end thereof such that the external apertures and corresponding internal decks are spaced below and aligned with the golf club clips for receiving and seating heads of the golf clubs through the external apertures and onto the corresponding internal decks; and
a mobile carriage including
  an elongated axle mounted through the lower annular portion of the endless sidewall of the holder body across and above a center of the lower closed end of the endless sidewall, the elongated axle protruding outwardly to opposite ends thereof in opposite directions from opposite sides of the lower annular portion of the endless sidewall, and
  a pair of wheels each rotatably supported by one of the opposite ends of the elongated axle and being of a predetermined diameter and also spaced outwardly from the endless sidewall of the holder body so as to provide spacing to allow placement and removal of respective ones of the golf clubs to and from about the exterior surface of the holder body and such that respective heads of the golf clubs when seated within the external apertures and corresponding internal decks in the lower annular portion of the endless sidewall are located at or below an overhead location of the elongated axle through the lower annular portion of the endless wall so that the weight of the upright golf clubs is effectively realized outboard of and under the elongated axle of the mobile carriage enabling support of the holder body in a self-centering counterbalanced relationship on the mobile carriage.

In another aspect of the present invention, a walking cart includes:
a holder body including
  an endless sidewall having opposite bottom and top ends,
  a multiplicity of golf club clips spaced from one another about an exterior surface of the endless sidewall and affixed on an upper annular portion of the endless sidewall spaced below and adjacent to the top end thereof for receiving and releasably retaining golf clubs in upright orientations along the exterior surface of the endless sidewall, and
  multiplicities of spaced apart external apertures and spaced apart corresponding internal decks formed through said exterior surface of said endless sidewall at a lower annular portion of said endless sidewall spaced above and adjacent to said bottom end thereof such that the external apertures and corresponding internal decks are spaced below and aligned with the golf club clips for receiving and seating heads of the golf clubs through the external apertures and onto the corresponding internal decks; and
a mobile carriage supporting the holder body in a centered upright balanced relationship thereon, said mobile carriage including
  a rigid framework of a rectangular configuration,
  a pair of front and rear axles supported by front and rear portions of the rigid framework, and
  front and rear pairs of wheels rotatably supported by opposite ends of the front and rear axles.

In another aspect of the present invention, the framework includes:
a pair of rigid front and rear cross frame members;
a pair of rigid opposite side frame members extending between and rigidly connected at their opposite ends to the opposite ends of the rigid front and rear cross frame members, and
a rigid middle frame member extending between and rigidly connected at its opposite ends to middle locations on the rigid front and rear cross frame members,
wherein the holder body at its closed bottom end rests upon the rigid middle frame member and is affixed to middle locations on interior sides of the rigid front and rear cross frame members and rigid opposite side frame members.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
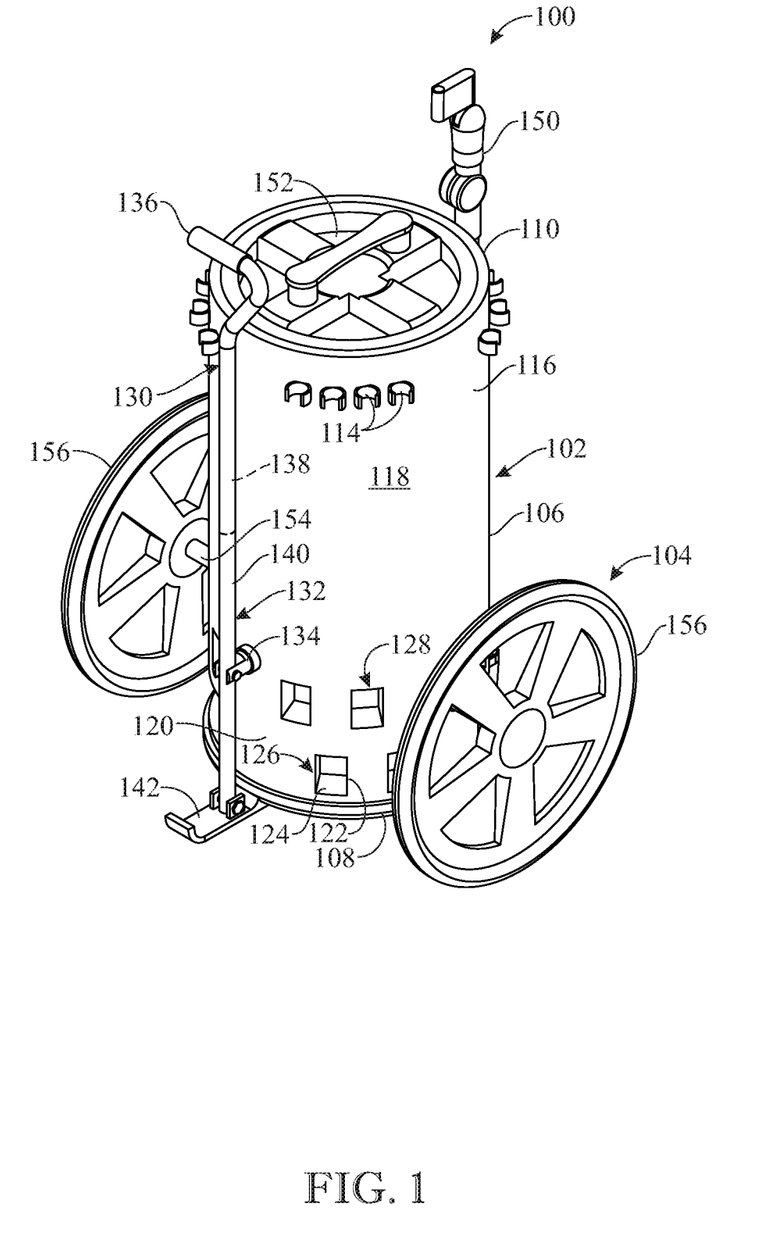
FIG. 1 presents a left front isometric view of an exemplary embodiment of a walking cart embodying a self-centering counterbalanced capability in accordance with aspects of the present invention, illustrating the walking cart before deploying a handle thereon to be used to pull the cart.
Figure 2:
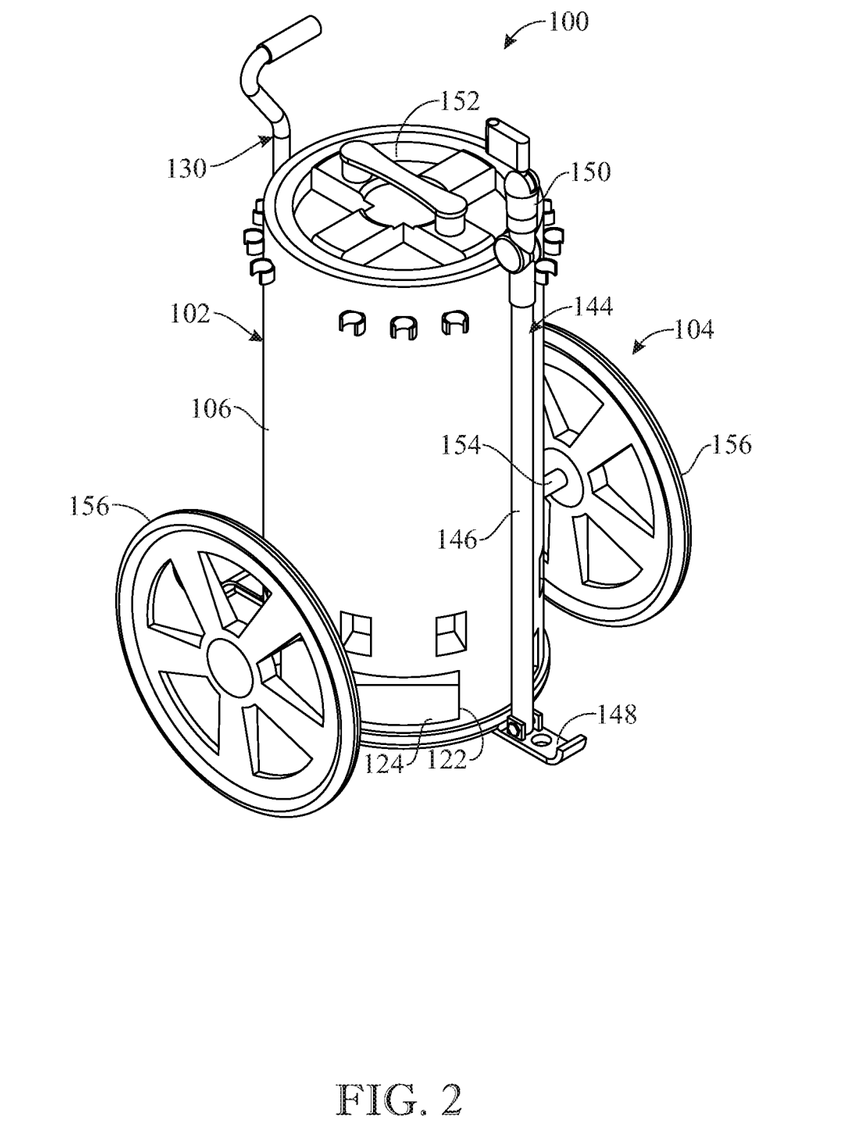
FIG. 2 presents a right front isometric view of the walking cart as originally introduced in FIG. 1.
Figure 3:
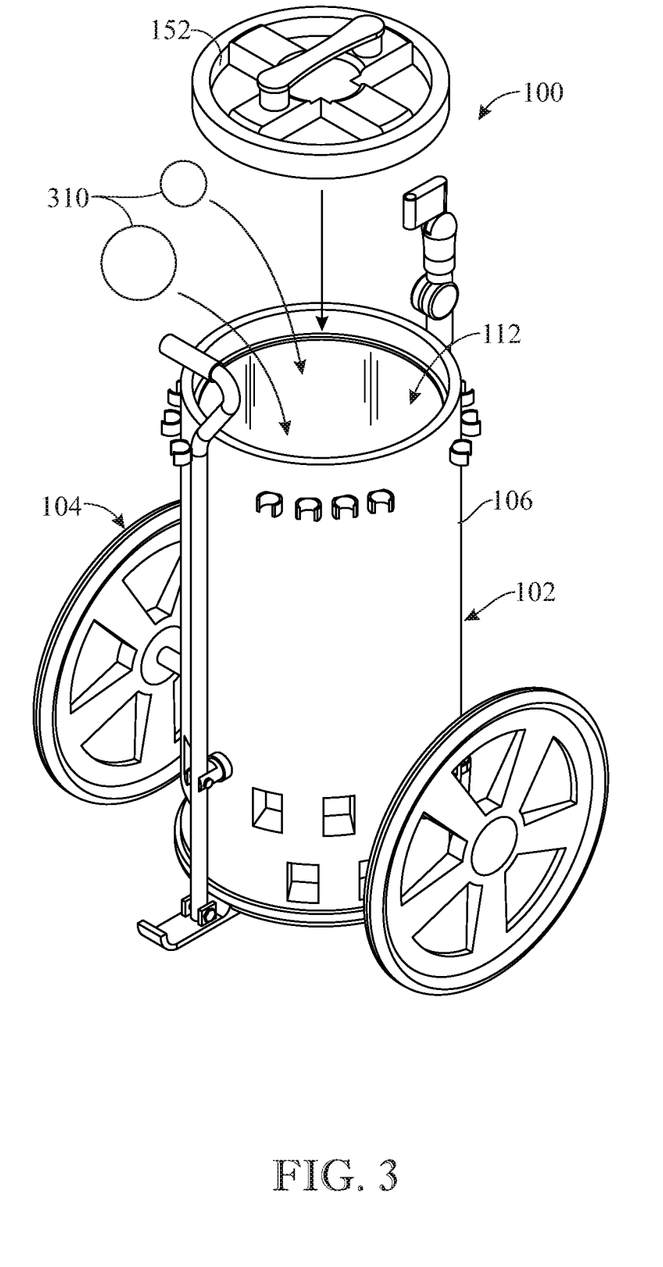
FIG. 3 presents a left front isometric view of the walking cart as originally introduced in FIG. 1, but now illustrated with a lid removed exposing an interior storage cavity in a holder body supported by a mobile carriage of the cart.
Figure 4:
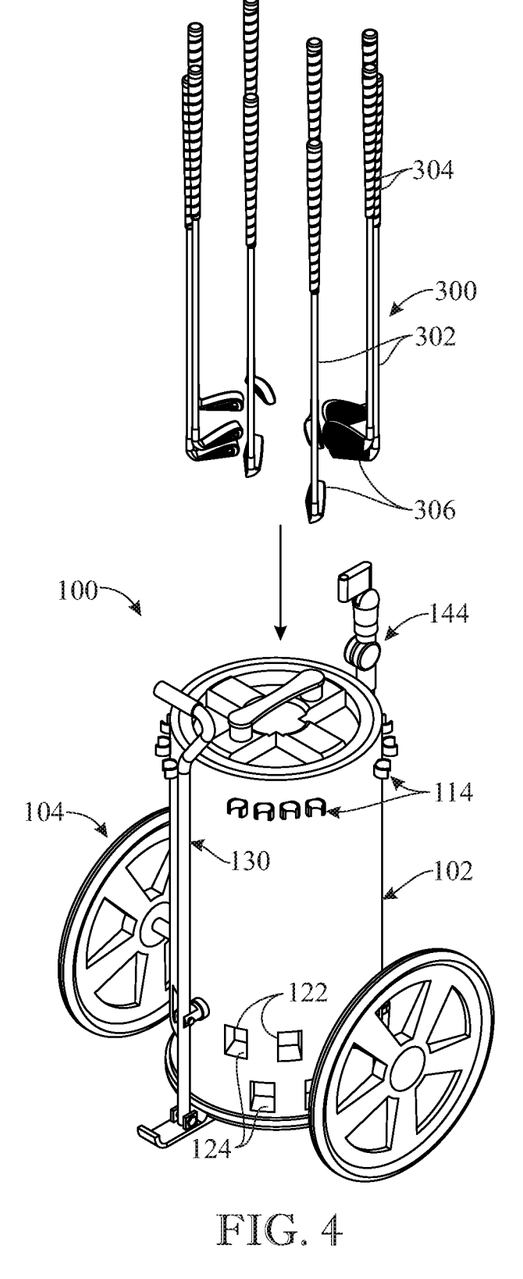
FIG. 4 presents a left front isometric view of the walking cart as originally introduced in FIG. 1, but on a reduced scale and illustrating a set of golf clubs aligned for mounting around an exterior of the holder body of the cart.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-7, there is illustrated an exemplary embodiment of a walking cart, generally designated 100, having a self-centering counterbalanced capability in accordance with aspects of the present invention. The walking cart 100 includes a holder body 102 and a mobile carriage 104 supporting the holder body. The holder body 104 may assume a self-centering, counterbalanced relationship to the mobile carriage 102 while supporting a set of golf clubs about the exterior thereof, as will be explained hereinafter.

More particularly, the holder body 102 of the walking cart 100 has a rigid upright endless sidewall 106 being of a cylindrical configuration and having a closed bottom end 108 and an open top end 110 defining an interior storage cavity 112 open at the top and closed at the bottom. The holder body 102 also has a multiplicity of golf club clips 114 affixed on an upper annular portion 116 of the endless sidewall 106 spaced below and adjacent to the open top end 110 thereof and are disposed about an exterior surface 118 of the endless sidewall 106. Also, the clips 114 are spaced from one another and disposed at the same elevation about the exterior surface 118 of the endless sidewall 106. The clips 114 are made of a conventional material, such as a suitable plastic or metal, being resiliently yieldable to expand and capture the golf clubs 300 about their respective shafts 302 proximate lower ends of their grips 304 so as retain the golf clubs in upright orientations along the exterior surface 118 of the endless sidewall 106.

The holder body 102 of the walking cart 100 at a lower annular portion 120 of the endless sidewall 106 has multiplicities of spaced apart external apertures 122 and spaced apart corresponding internal decks 124 formed through the exterior surface 118 of the endless sidewall 106 and spaced above and adjacent to the closed bottom end 108 thereof. The external apertures 122 and corresponding internal decks 124 also are spaced below and aligned with the golf club clips 114 for receiving the golf club heads 306 through the external apertures 122 and seating them on the corresponding internal decks 124. An example but not as a limitation, the external apertures 122 with the corresponding internal decks 124 are arranged in lower and upper horizontal rows 126, 128 at different elevations about the exterior surface 118 of the endless sidewall 106. The external apertures 120 with the corresponding internal decks 124 in one of the rows are offset from those in the other of the rows. The external apertures 120 with the corresponding internal decks 124 thus receive and seat the respective heads 306 of the individual golf clubs 300 being held and retained by their shafts 302 extending upright by the golf club clips 114.

Figure 5:
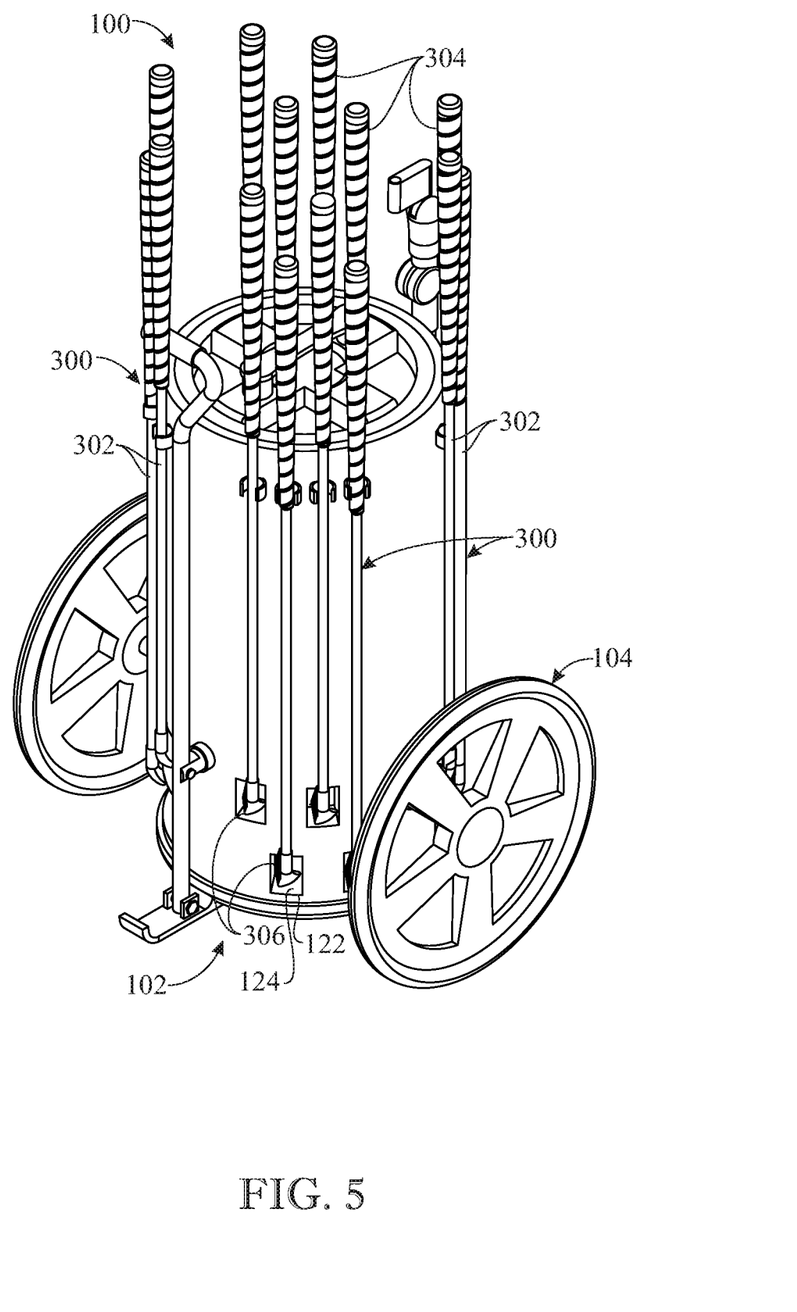
FIG. 5 presents a left front isometric view of the walking cart as originally introduced in FIG. 1, but on an enlarged scale and illustrating a set of golf clubs mounted around the exterior of the holder body of the cart.
Figure 6:
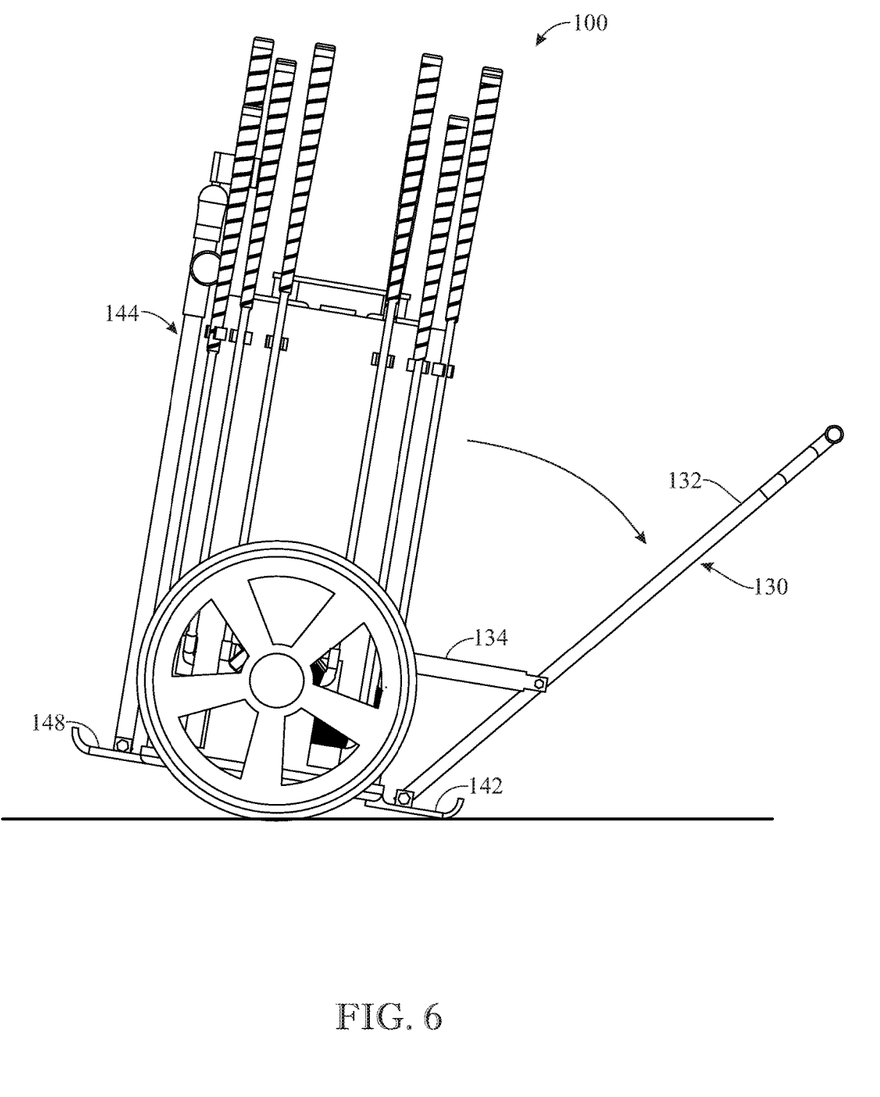
FIG. 6 presents a right side elevation view of the walking cart as originally introduced in FIG. 5, but illustrating the cart in a standing position with a handle in a deployed position to be used to pull the cart.
Figure 7:
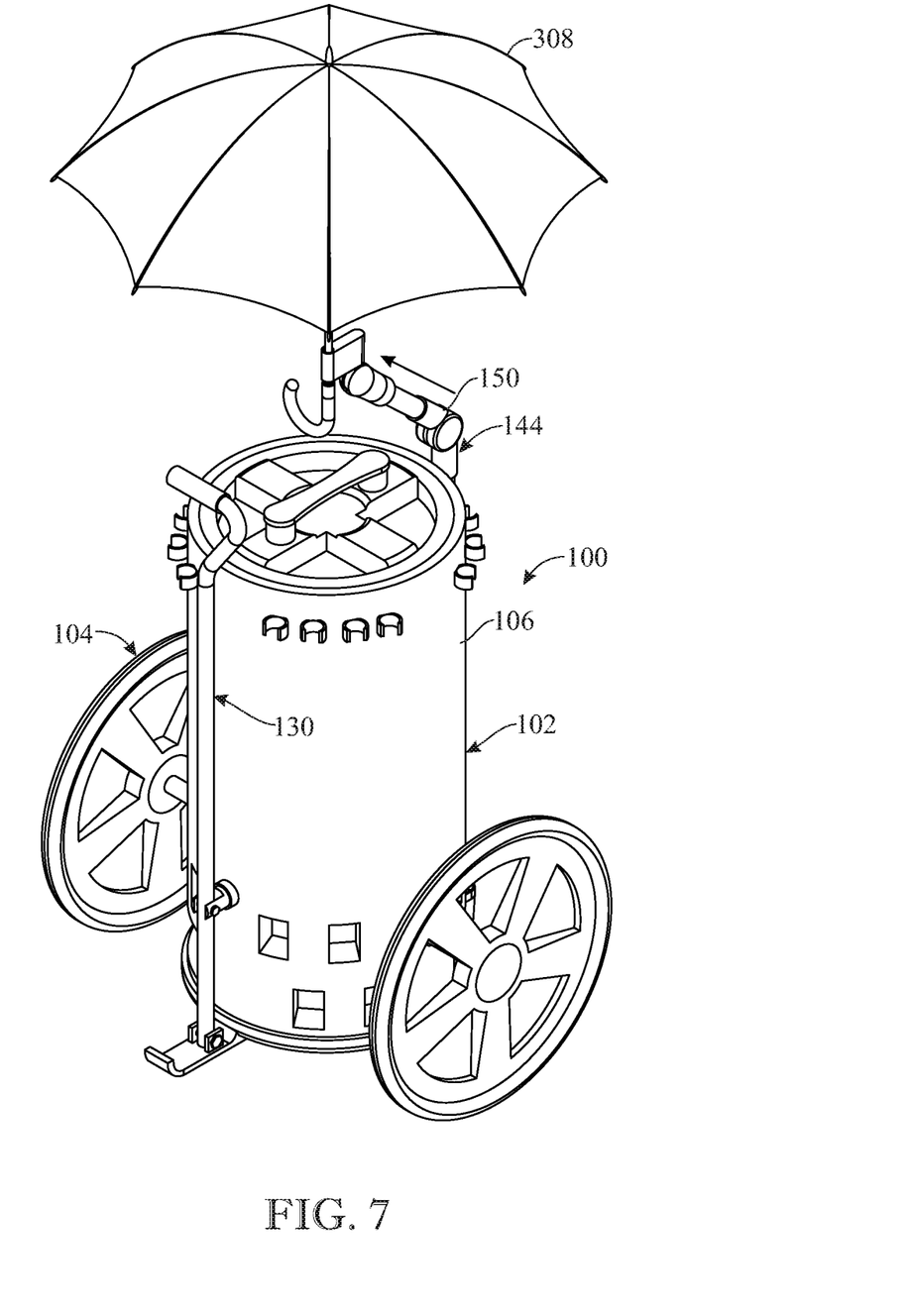
FIG. 7 presents a left front isometric view of the walking cart originally introduced in FIG. 1, but illustrating the cart before deploying the pulling handle and after deploying an arm on the cart used to support an umbrella above the holder body of the cart.

The walking cart 100 also includes a handle 130 disposed at a forward side of the exterior surface 118 of the endless sidewall 106 of the holder body 102. The handle 130 includes an elongated shaft 132 and a coupling rod 134. The elongated shaft 134 of the handle 130 has a hand grip 136 formed at its upper end. The elongated shaft 132 proximate the hand grip 136 is provided with upper and lower telescoping sections 138, 140 that enable adjustment of the length of the handle 130 to accommodate users of different heights. The elongated shaft 132 at its bottom end is pivotally coupled to a forward end of the closed bottom end 108 of the endless sidewall 106 of the holder body 102 via a bar 142 attached on and projecting forwardly from the endless sidewall 106. A front portion of the bar 142 is curved upward to prevent it from becoming impaled in the ground during movement of the handle 130 from a stored position, as seen in FIG. 5, to a deployed position, as seen in FIG. 6, or at any other times during use of the walking cart 100.

The coupling rod 134 of the handle 130 is pivotally coupled at an outer end to the elongated shaft 132 of the handle at a location closer to the bottom end than to the top end of the elongated shaft. The coupling rod 134 is telescopically or slidably adjustable at an inner end (not shown) to the front side of the endless sidewall 106 so as to limit extension of the coupling rod 134 from the endless sidewall 106 while still enabling adjustment of the angular position of the handle 130 relative to the holder body 102 to additionally accommodate users of different heights.

Further, the walking cart 100 includes a mounting stand 144 disposed at a rearward side of the exterior surface 118 of the endless sidewall 106 of the holder body 102. The mounting stand 144 has an elongated shaft 146 at its bottom end is pivotally coupled to a rearward end of the closed bottom end 108 of the endless sidewall 106 of the holder body 102 via another bar 148 that is attached on and projecting rearwardly from the endless sidewall 106. The pivotal attachment of the elongated shaft 146 to the bar 148 incorporates a frictional engagement therewith that enables the elongated shaft to be placed and remain in any desired angular position relative to the holder body 102. The mounting stand 144 also has a multi-axial adjustable knuckle 150 attached to an upper end of the elongated shaft 146. By way of example but not of limitation, by manipulation of the adjustable knuckle 150 on the mounting stand 144, an umbrella 308 may be mounted at a position directly above the open top end 110 to the interior storage cavity 112 of the holder body 102 so as to protect the walking cart 100 and the golf clubs 300 and also retrieval of items 310 from the interior storage cavity by removal of a cover 152 from the holder body 102.

As seen in FIGS. 1-7, the mobile carriage 104 of the walking cart 100 is a two-wheel version. The mobile carriage 104 includes an elongated axle 154 mounted through and across the center of the lower annular portion 120 of the endless sidewall 106 of the holder body 102, and protrudes outwardly in opposite directions from opposite sides of the lower annular portion 120 of the endless sidewall 106 of the holder body 102. The mobile carriage 102 also includes a pair of wheels 156 rotatably supported by the opposite ends of the elongated axle 154. The wheels 156 are of sufficient diameter and also spacing outwardly from the endless sidewall 106 of the holder body 102 so as to allow placement of respective ones of the golf clubs 300 therebetween. A significant portion, if not all, of the respective heads 306 of the individual golf clubs 300 are seated within the external apertures 122 and the corresponding internal decks 124 in the lower annular portion 120 of the endless sidewall 106 that are located at or below the overhead location of the elongated axle 154 through the lower annular portion of the endless wall. Thus, the weight of the upright golf clubs 300 is effectively realized outboard of and under the axle 154 of the mobile carriage 104 of the walking cart 100.

Certain of the above-described features of the walking cart 100 provide a number of attributes not realized heretofore that contribute to the overall self-centering, counterbalanced relationship of the holder body 102 to the mobile carriage 104. A first of these attributes is the position of the axle 154 being through the center of the holder body 102 of the walking cart and above the point where the heads 306 of the golf clubs 300 are seated and rest on the internal decks 124 ensures that the overall weight has not shifted outboard to one side of the axle or off-center with respect to the axle. A second of these attributes is the endless sidewall 106 of the holder body 102 being circular, or cylindrical, in configuration and also the axle 154 being disposed through, and the internal decks 124 being formed in, the lower annular portion 122 of the endless sidewall provides the most efficient use of available space by providing sufficient space above the axle 154 and decks 124 for storage of equipment such as clothing, golf balls, etc., with access to this space being by removal of the cover 152 from the open top end of the holder body 102. A third of these attributes is the handle 130 having two telescoping features relative to the holder body 102 which provides the capability of a reasonably variable hand height while the holder body 102 in maintained in balance at its vertical running position. A fourth of these attributes is the adjustable mounting stand 144 that reduces the problems with playing in inclement weather, such as rain showers, in that the equipment is protected. A fifth of these attributes is the oppositely-protruding bars 142, 148 mounted on the opposite sides of the bottom end of the holder body 102 which enable parking the cart 100 so that it tilts either forward or backward without the golf clubs 300 or holder body 102 contacting the ground. The bars allow easy access to the golf clubs 300 and can counteract against windy conditions and/or sloping ground that might otherwise contribute to tipping of the cart.

Figure 8:
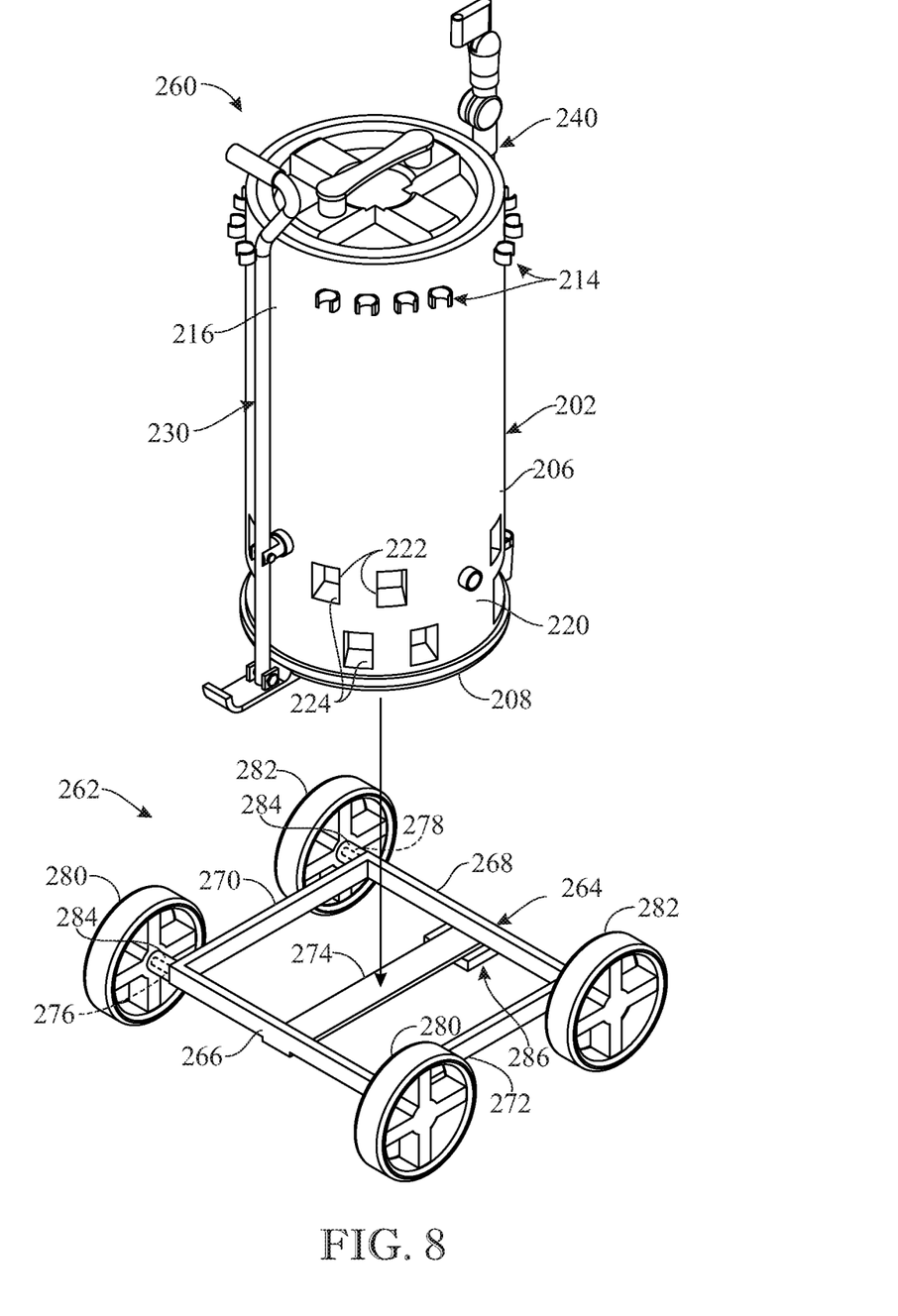
FIG. 8 presents a left front exploded isometric view of an alternative exemplary embodiment of a walking cart in accordance with aspects of the present invention, illustrating the cart before assembling a holder body onto a mobile carriage of the cart.
Figure 9:
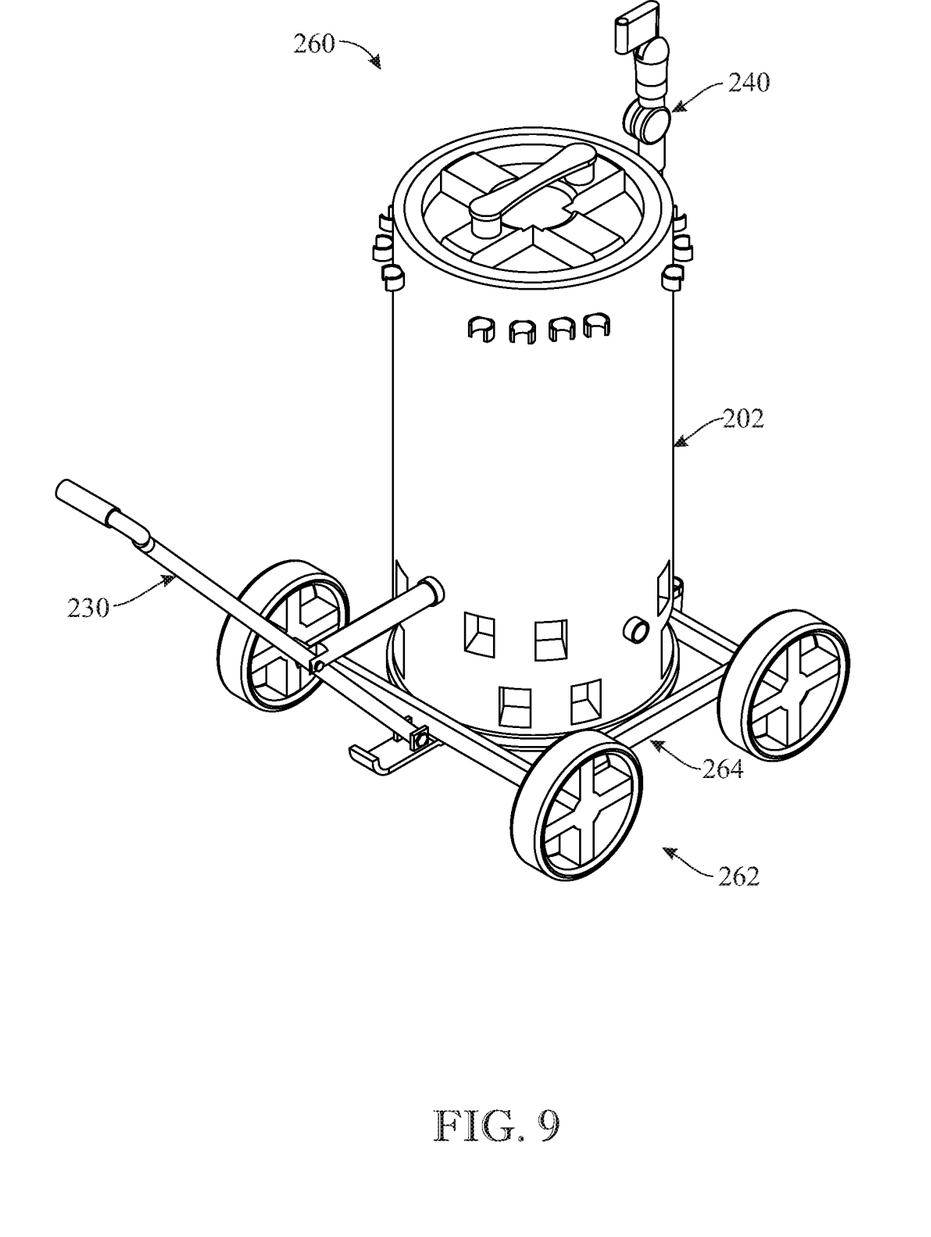
FIG. 9 presents a left front isometric view of the walking cart originally introduced in FIG. 8, but illustrating the cart after assembling the holder body onto the mobile carriage of the cart.

Turning now to FIGS. 8 and 9, there is illustrated an alternative exemplary embodiment of a walking cart, generally designated 260, in accordance with aspects of the present invention. The walking cart 260 has a holder body 202 and a mobile carriage 262. The holder body 202 is the same as that of the earlier embodiment of the walking cart 100. It has a rigid upright endless sidewall 206 with a multiplicity of golf club clips 214 affixed on an upper annular portion 216 of the endless sidewall, and multiplicities of external apertures 222 and internal decks 224 formed in a lower annular portion 220 of the endless sidewall. The external apertures 222 with the internal decks 224 receive and seat respective heads 306 of the individual golf clubs 300 being retained upright by the golf club clips 214. Thus, the same reference numerals, except for a change in the prefix of the reference numerals from "1" to "2", indicates the same components of the holder body 202 in this alternative embodiment as in the holder body 102 of the first embodiment and thus these same components need not be described in detail in the following detailed description in order to gain a complete understanding of the components of this alternative embodiment. Reference can be made to the detailed description of the same components of the first embodiment with the corresponding reference numerals as explained above. Only the components of the mobile carriage 262 of this alternative embodiment of the walking cart 260 will be described and identified with new reference numerals.

The mobile carriage 262 of the walking cart 260 includes a rigid framework 264 of a rectangular configuration. The framework 264 has a pair of rigid front and rear cross frame members 266, 268 and a pair of rigid opposite side frame members 270, 272 extending between and rigidly connected at their opposite ends to the opposite ends of the rigid front and rear cross frame members. Also, the framework 264 has a rigid middle frame member 274 extending between and rigidly connected at its opposite ends to middle locations on the rigid front and rear cross frame members 266, 268. The mobile carriage 262 also includes front and rear axles 276, 278 supported by the rigid front and rear cross frame members 266, 268 with opposite ends of the axles protruding beyond the connections of the opposite ends of the rigid opposite side frame members 270, 272 to the opposite ends of the rigid front and rear cross frame member 266, 268. The mobile carriage 262 further includes four wheels in the form of a pair of front wheels 280 rotatably supported by the opposite ends of the front axle 276 and a pair of rear wheels 282 rotatably supported by the opposite ends of the rear axle 278. The holder body 202 at its closed bottom end 208 rests upon the rigid middle frame member 274 and is affixed to middle locations on interior sides of the rigid front and rear cross frame members 266, 268 and of the rigid opposite side frame members 270, 272. It is contemplated without departing from the intended scope of the invention that the pair of front pair 280 and/or rear pair 282 of wheels of the mobile carriage 262 be powered by a motor, for example, but not limited to, a 24 Volt electric motor 284. The electric motor in one exemplary implementation of the present invention, may be generally integrated (or coupled to) the front and/or rear axles 278, 276 of the mobile carriage assembly by known means to those skilled in the art. The electric motor 284 may include a variable speed input dial which allows for the user to set a desirable speed when pushing the mobile carriage 262 or controlled wirelessly through a remote control receiver or a mobile phone (or tablet) application via Bluetooth, RF, or the like. A battery 286, such as a lithium-ion battery, may be mounted underneath the middle rigid frame member 274 of the mobile carriage 262 to energize the electric motors 284. However, should the user want the battery 286 hidden from sight, the battery 286 may be stored within the walking cart 260 interior storage cavity 112 for protection and to provide the cart with a more aesthetic look. The battery 284 used has the capability to power the electric motors 284 for at least a single round of golf (i.e. 18 holes) before needing to be recharged ensuring that the user does not run out of power while still on the course.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:
1. A walking cart, comprising:
    a holder body comprising
        an endless sidewall having opposite bottom and top ends,
        a multiplicity of golf club clips spaced from one another disposed around an exterior surface of said endless sidewall and affixed on an upper annular portion of said endless sidewall spaced below and adjacent to said top end thereof for receiving and releasably retaining golf clubs in upright orientations along said exterior surface of said endless sidewall, and
        multiplicities of spaced apart external apertures and spaced apart corresponding internal decks formed through said exterior surface of said endless sidewall at a lower annular portion of said endless sidewall spaced above and adjacent to said bottom end thereof such that said external apertures and corresponding internal decks are spaced below and aligned with said golf club clips for receiving and seating heads of the golf clubs through said external apertures and onto said corresponding internal decks, a handle disposed at a forward side of said endless sidewall of said holder body, said handle comprising
an elongated shaft pivotally coupled at a bottom end to said bottom end of said endless sidewall, and
a coupling rod pivotally coupled at an outer end to said elongated shaft and telescopically and slidably adjustable at an inner end relative to said front side of said endless sidewall so as to limit extension of said coupling rod from said endless sidewall while still enabling adjustment of an angular position of said elongated shaft of said handle relative to said holder body to accommodate users of different heights; and
a mobile carriage supporting the holder body in a self-centering counterbalanced relationship on said mobile carriage.

2. The walking cart of claim 1 wherein said endless sidewall of said holder body is of a cylindrical configuration.

3. The walking cart of claim 1 wherein said multiplicity of golf club clips are disposed in a horizontal row at the same elevation about said exterior surface and below said top end of said endless sidewall of said holder body.

4. The walking cart of claim 3 wherein said multiplicity of golf club clips are resiliently yieldable to expand and capture the golf clubs about respective shafts thereof.

5. The walking cart of claim 1 wherein said multiplicities of external apertures and corresponding internal decks are arranged in lower and upper horizontal rows at different elevations about said exterior surface and above said bottom end of said endless sidewall of said holder body.

6. The walking cart of claim 5 wherein said external apertures and corresponding internal decks in one of said rows are offset from said external apertures and corresponding internal decks in the other of said rows.

7. The walking cart of claim 1 wherein said handle also comprises a hand grip at an upper end of said elongated shaft such that proximate said hand grip said elongated shaft has upper and lower telescoping sections that enable adjustment of the length of said handle to accommodate users of different heights.

8. The walking cart of claim 1 further comprising a mounting stand disposed at a rearward side of said endless sidewall of said holder body, said mounting stand comprising
an elongated shaft pivotally attached at a bottom end to said bottom end of said endless sidewall, and
a multi-axial adjustable knuckle attached to an upper end of said elongated shaft for mounting an umbrella at a position directly above said top end of said endless sidewall of said holder body.

9. The walking cart of claim 1 wherein said opposite bottom and top ends of said endless sidewall of said holder body are respectively closed and open such that said endless sidewall defines an interior storage cavity open at a top and closed at a bottom thereof.

10. The walking cart of claim 9 wherein said holder body includes a lid disposed over and removable from said open top end of said endless sidewall of said holder body to close and open said interior storage cavity thereof.

11. A walking golf cart, comprising:
a holder body comprising
an endless sidewall having a closed bottom end and an open top end defining an interior storage cavity therebetween being open at a top and closed at a bottom thereof,
a multiplicity of golf club clips spaced from one another disposed around an exterior surface of said endless sidewall and affixed on an upper annular portion of said endless sidewall spaced below and adjacent to said open top end thereof for receiving and releasably retaining golf clubs in upright orientations along said exterior surface of said endless sidewall, and
multiplicities of spaced apart external apertures and spaced apart corresponding internal decks formed through said exterior surface of said endless sidewall at a lower annular portion of said endless sidewall spaced above and adjacent to said closed bottom end thereof such that said external apertures and corresponding internal decks are spaced below and aligned with said golf club clips for receiving and seating heads of the golf clubs through said external apertures and onto said corresponding internal decks; and
a mobile carriage comprising
an elongated axle mounted through said lower annular portion of said endless sidewall of said holder body across and above a center of said lower closed end of said endless sidewall, said elongated axle protruding outwardly to opposite ends thereof in opposite directions from opposite sides of said lower annular portion of said endless sidewall, and
a pair of wheels each rotatably supported by one of said opposite ends of said elongated axle and spaced outwardly from said endless sidewall of said holder body so as to provide spacing to allow placement and removal of respective ones of the golf clubs to and from about said exterior surface of said holder body and such that respective heads of the golf clubs when seated within said external apertures and corresponding internal decks in said lower annular portion of said endless sidewall are located at or below an overhead location of said elongated axle through said lower annular portion of said endless wall so that the weight of the upright golf clubs is effectively realized outboard of and under said elongated axle of said mobile carriage enabling support of said holder body in a self-centering counterbalanced relationship on said mobile carriage.

12. The golf cart of claim 11 wherein said endless sidewall of said holder body is of a cylindrical configuration.

13. The golf cart of claim 11 wherein said multiplicity of golf club clips are disposed in a horizontal row at the same elevation about said exterior surface and below said open top end of said endless sidewall of said holder body.

14. The golf cart of claim 11 wherein said multiplicities of external apertures and corresponding internal decks are arranged in lower and upper horizontal rows at different elevations about said exterior surface and above said closed bottom end of said endless sidewall of said holder body.

15. The golf cart of claim 14 wherein said external apertures and corresponding internal decks in one of said rows are offset from said external apertures and corresponding internal decks in the other of said rows.

16. The golf cart of claim 11 further comprising a handle disposed at a forward side of said endless sidewall of said holder body, said handle comprising
an elongated shaft pivotally coupled at a bottom end to said bottom end of said endless sidewall, and
a coupling rod pivotally coupled at an outer end to said elongated shaft and telescopically and slidably adjustable at an inner end relative to said front side of said endless sidewall so as to limit extension of said coupling rod from said endless sidewall while still enabling adjustment of an angular position of said elongated shaft of said handle relative to said holder body to accommodate users of different heights.

17. The walking cart of claim 16 wherein said handle also comprises a hand grip at an upper end of said elongated shaft such that proximate said hand grip said elongated shaft has upper and lower telescoping sections that enable adjustment of the length of said handle to accommodate users of different heights.

\* \* \* \* \*